(12) United States Patent
Vauchel

(10) Patent No.: US 8,793,973 B2
(45) Date of Patent: Aug. 5, 2014

(54) THRUST REVERSER FOR A DUAL-FLOW TURBINE ENGINE NACELLE

(75) Inventor: Guy Bernard Vauchel, Harfleur (FR)

(73) Assignee: Aircelle, Gonfreville l'Orcher (FR)

( * ) Notice: Subject to any disclaimer, the term of this patent is extended or adjusted under 35 U.S.C. 154(b) by 474 days.

(21) Appl. No.: 13/320,984

(22) PCT Filed: May 18, 2010

(86) PCT No.: PCT/FR2010/050954
§ 371 (c)(1),
(2), (4) Date: Nov. 17, 2011

(87) PCT Pub. No.: WO2010/139877
PCT Pub. Date: Dec. 9, 2010

(65) Prior Publication Data
US 2012/0067024 A1    Mar. 22, 2012

(30) Foreign Application Priority Data

Jun. 2, 2009  (FR) ...................................... 09 53630

(51) Int. Cl.
| | |
|---|---|
| F02K 3/02 | (2006.01) |
| F02K 1/00 | (2006.01) |
| B63H 11/10 | (2006.01) |
| B63H 25/46 | (2006.01) |
| B05B 12/00 | (2006.01) |
| F02K 1/76 | (2006.01) |
| F02K 1/72 | (2006.01) |

(52) U.S. Cl.
CPC . *F02K 1/72* (2013.01); *F02K 1/763* (2013.01); *F05D 2270/66* (2013.01); *Y02T 50/671* (2013.01)
USPC .. 60/226.2; 60/230; 239/265.19; 239/265.23; 239/265.29; 239/265.33; 239/265.37

(58) Field of Classification Search
USPC ................. 60/226.2, 226.3, 230; 239/265.11, 239/265.19, 265.23, 265.29, 265.33, 265.37
See application file for complete search history.

(56) References Cited

U.S. PATENT DOCUMENTS 3,262,268 A    7/1966  Beavers

FOREIGN PATENT DOCUMENTS

| FR | 2907512 A1 | 4/2008 |
| FR | 2917788 A1 | 12/2008 |

OTHER PUBLICATIONS

International Search Report issued Aug. 26, 2010 by European Patent Office re: PCT/FR2010/050954; citing: US 3,262,268 A, FR 2 907 512 A1 and FR 2 917 788 A1.

*Primary Examiner* — William H Rodriguez
*Assistant Examiner* — Arun Goyal
(74) *Attorney, Agent, or Firm* — Brinks Gilson & Lione

(57) ABSTRACT

The invention relates to a thrust reverser (1) for the nacelle of a dual-flow turbine engine, in which the bypass means (4) and the actuation jacks (22) of the sliding cowling (2) and of the reverse flaps (20) are arranged in two substantially parallel planes arranged above one another in the radial direction of the nacelle. The invention also relates to a nacelle for a dual-flow turbine engine that comprises such a thrust reverser.

15 Claims, 5 Drawing Sheets

THRUST REVERSER FOR A DUAL-FLOW TURBINE ENGINE NACELLE

TECHNICAL FIELD

The present invention concerns a so-called cascade vane thrust reverser for a jet engine.

BACKGROUND

An aircraft is propelled by several turbojet engines each housed in a nacelle which also houses an assembly of ancillary actuating devices related to the functioning thereof and ensuring various functions when the turbojet engine is or is not in operation. These ancillary actuating devices particularly comprise a mechanical thrust reverser system.

More precisely, a nacelle generally has a tubular structure comprising an air inlet upstream of the turbojet engine, a median section intended to surround a fan of the turbojet engine, a downstream section housing the thrust reverser means and intended to surround the combustion chamber of the turbojet engine, and generally ends in an exhaust nozzle whose outlet lies downstream from the turbojet.

Modern nacelles are intended to house a turbofan jet engine capable, via the rotating fan blades, of generating a flow of hot air (also called the primary air stream) originating from the combustion chamber of the turbojet, and a flow of cold air (secondary air stream) also called the fan duct flow which circulates outside the turbojet through an annular bypass duct formed between a cowling of the jet engine and an inner wall of the nacelle. The two air streams are exhausted from the jet engine via the rear of the nacelle.

The role of a thrust reverser, on landing of an aircraft, is to improve the braking capacity thereof by re-directing forwardly at least part of the thrust generated by the turbojet engine. During this phase, the reverser blocks the bypass duct of the cold stream airflow and directs this stream towards the front of the nacelle, thereby generating a counter-thrust which adds to the braking of the aircraft's wheels.

The means applied to achieve this re-directing of the cold air stream vary according to the type of reverser. However, in all cases, the structure of the reverser comprises mobile cowls which can move firstly between a deployed position in which they open up a passage in the nacelle intended for passing of the diverted air flow, and secondly a stowed position in which they close this passageway. These cowls may fulfil a diverting function or simply an actuation function of other diverting means.

With regard to a thrust reverser known as a cascade reverser, the re-directing of the air stream is obtained via diverting vanes, the cowl merely having a sliding function intended to uncover or cover these vanes. Complementary blocker doors actuated by the sliding of the cowling, generally allow closure of the bypass duct downstream of the vanes so as to optimise the re-directing of the cold air stream.

These blocker doors are pivot-mounted at an upstream end on the sliding cowl between a stowed position in which, together with the said sliding cowl, they ensure the aerodynamic continuity of the inner wall of the nacelle, and a deployed position in which, in thrust reversing conditions, they come to close the bypass duct at least in part so as to divert a cold air stream towards the diverting vanes uncovered by the sliding of the sliding cowl.

The pivoting of the blocker doors is generally guided by links attached to the blocker door at a fixed point of the inner structure delimiting the annular bypass duct.

Yet since the guiding links pass through the bypass duct, they generate numerous aerodynamic perturbations in the secondary air stream.

Also, the fixing of these links on the inner structure requires the installation of fixed hinge points on the latter, which reduces the surface area of the inner structure which could be used for acoustic treatment of the said inner structure.

In addition, the thrust reverser structure is mechanically connected to the inner structure via the links. On this account, the thrust reverser structure and the inner structure are not independent of each other, which complicates dismounting thereof when maintenance operations on the nacelle or turbojet so require, in particular with external structures of so-called <<O-duct>> type i.e. manufactured in a single piece completely surrounding the turbojet, contrary to structures of so-called <<C-duct>> type comprising two semi-parts joined together around the turbojet.

To overcome these problems, numerous solutions have been proposed including the one described in patent application FR 2 907 512 to the Applicant.

In this application, a thrust reverser is proposed for a jet engine in which the sliding cowl is capable of translating by means of an actuating cylinder mounted on a fixed upstream structure. The actuating cylinder comprises a base housing a concentric driving slider having a terminal rod connected to the sliding cowl. The driving slider and the terminal rod are both mobile in a direction substantially parallel to the longitudinal axis of the nacelle independently of each other. The driving slider is also connected to a downstream end of the blocker door via a driving link so that a movement in translation of the slider is accompanied by pivoting of the link and hence of the blocker door, and in which actuation means are provided to drive the slider in translation when the sliding cowl is in a translation phase towards downstream.

However, a said thrust reverser is fairly complex to manufacture on industrial scale, and despite its advantages the implementation thereof entails some difficulties.

The link driving the blocker door may in particular pass through a monolithic skin called a diaphragm which blocks the passing of the cold air from the bypass duct to the vane when the sliding cowl is in stowed position. Yet, the purpose of the diaphragm is to ensure a simple, reliable sealed barrier against any outflow of cold air through the vanes in the closed position of the sliding cowl.

In addition, the seal between the bypass duct in which the cold air stream flows and the outside of the nacelle is formed on the external structure of the nacelle, inducing additional pressure on the inner structure of the nacelle. Therefore, it is necessary to reinforce this inner structure which penalises the weight of the nacelle.

Also, the actuating cylinder passes through the flow reversing vane preventing the installation of self-supporting vanes i.e. fixed radially onto each other to avoid the mounting of a carrier structure downstream of these vanes. A said self-supporting installation would allow savings in space and weight.

Additionally, since the end of the link is fixed onto the driving slider, this interferes with the reversing vane, reducing flow reversing efficiency and degrading the installation in the area of interference.

BRIEF SUMMARY

The invention provides a thrust reverser, whose blocker doors are not attached to the inner structure, which is efficient, easy to manufacture industrially and does not have the above-mentioned drawbacks.

For this purpose, according to a first aspect, the subject of the invention is a thrust reverser for the nacelle of a turbofan jet engine comprising:

a fixed upstream structure, fixed diverting means attached to the fixed upstream structure, the said means being capable of diverting at least part of the cold air stream of the turbojet engine outside the nacelle, a cowl sliding in translation in a direction substantially parallel to a longitudinal axis of the nacelle, at least one blocker door, pivot mounted at an upstream end on the sliding cowl, the blocker door(s) being driven via a driving link, the sliding cowl being mobile via at least one actuating cylinder, and the blocker door also being connected to an actuating cylinder via at least one driving link so that a movement in translation of the actuating cylinder(s) of the sliding cowl and of the actuating cylinder of the blocker door enables the said sliding cowl alternately to change from a closed position in which the blocker door is in stowed position and the sliding cowl ensures the aerodynamic continuity of the nacelle by covering the diverting means, to an open position in which the sliding cowl opens a passageway in the nacelle uncovering the diverting means and the blocker door is in pivoted position blocking part of an annular duct of the nacelle, characterized in that the diverting means and the actuating cylinders are arranged in two substantially parallel planes one above the other in a radial direction of the nacelle.

The reverser of the invention allows the radial separation of the thrust reversing means from the actuating cylinders and from the blocker door. Therefore the driving system of the cowl and blocker door is positioned outside the envelope of the reversing means.

With said configuration, it is advantageously possible:

to simplify the installation of the thrust reversing means and to reduce the weight of the latter by eliminating the carrier structure;

to isolate the space intended to receive the thrust reversing means, and hence the inner structure of the sliding cowl, from the cold air stream;

to avoid any interference between the functioning of the door-driving link and the diverting means;

if necessary, to provide for a solid diaphragm between the plane containing the diverting means and the actuating cylinders, without the presence of one or more openings for the passing and functioning of one or more actuating links, that improves the sealing function, is easy to install and efficient.

According to other characteristics of the invention, the reverser of the invention comprises one or more of the following optional characteristics taken alone or in any possible combination:

the actuating cylinder of the blocker door is an actuating cylinder of the sliding cowl comprising a driving slider surrounding a terminal rod connected to the sliding cowl, the driving link being fixed onto the slider so that a movement in translation of the actuating cylinder in one direction is accompanied by a movement in translation of the sliding cowl in the same direction, and by a pivoting movement of the driving link and blocker door;

the actuating cylinder is configured so that the driving slider and the terminal rod can be set in movement in substantially synchronized manner at different speeds;

the actuating cylinder comprises a cylindrical sleeve which innerly houses the driving slider, the terminal rod and an intermediate body inter-positioned between the driving slider and the terminal rod, each of the three bodies being mechanically engaged with the adjacent body via screw threads;

two driving links are placed on each side of the driving slider;

the blocker door(s) have an upstream cut-out configured to allow the passing of at least part of the driving slider;

the sliding cowl further comprises a diaphragm configured to ensure the sealing of the nacelle in closed position, the said diaphragm being inserted between the plane of the diverting means and the plane of the actuating cylinders when the sliding cowl is in closed position, so that the functioning of the driving link does not interfere with the diaphragm;

the diaphragm, at an upstream end, comprises an excrescence capable of being compressed onto a sealing gasket mounted on the fixed upstream structure in the closed position of the sliding cowl;

the diaphragm carries at least one reinforced, guiding slide-rail capable of guiding the driving slider and capable of preventing bending of the driving slider of the actuating cylinder;

the diaphragm comprises a notched upstream end capable of allowing the passing of at least part of the driving slider;

the diaphragm comprises an upstream apron;

the apron is scalloped;

first sealing means are arranged between the upstream end of the diaphragm and the downstream end of the diverting means;

second sealing means are arranged between the apron of the diaphragm and the upstream end of the blocker door(s);

the downstream end of a blocker door substantially overlaps an upstream extension of the sliding cowl;

the direction of the driving link is substantially normal to the axis of the driving slider of the actuating cylinder of the sliding cowl in thrust reversing phase;

at least one of the blocker doors is driven by one or two adjacent blocker doors controlled by an actuating cylinder;

the driving of the driven blocker door is achieved via a transmission link mounted on one end of the driven blocker door and cooperating with an arm fixed to the driving blocker door(s);

the arm and the transmission link are positioned so that they allow the overlapping of the lower ends of the blocker doors.

the arm is positioned laterally on the inner structure of the driving blocker door on the side adjoining the driven side so that the connecting point of the arm with the transmission link is cantilevered relative to the structure of the driven blocker door;

one of the pins of the transmission link comprises a spring system;

the driven blocker door comprises upstream abutment means capable of abutting an element of mating shape in the fixed structure when the said blocker door is in stowed position;

the abutment means form a stop pin capable of fitting inside a housing provided in the fixed structure;

the driving and driven blocker doors are capable substantially of overlapping at one of their ends, at least one end being equipped with elastic or tensioning means;

the part of the blocker door coming into contact with the elastic means or tensioning means comprises a surface reinforcement in the form of a panel enclosing a unit with honeycomb core;

a single actuating cylinder drives three blocker doors via a servo system.

According to another aspect of the invention, the subject of the invention is a nacelle for turbofan jet engine comprising a thrust reverser conforming to the invention.

BRIEF DESCRIPTION OF THE INVENTION

The invention will be further understood on reading the non-limiting description given below with reference to the appended figures.

DETAILED DESCRIPTION

Figure 1:
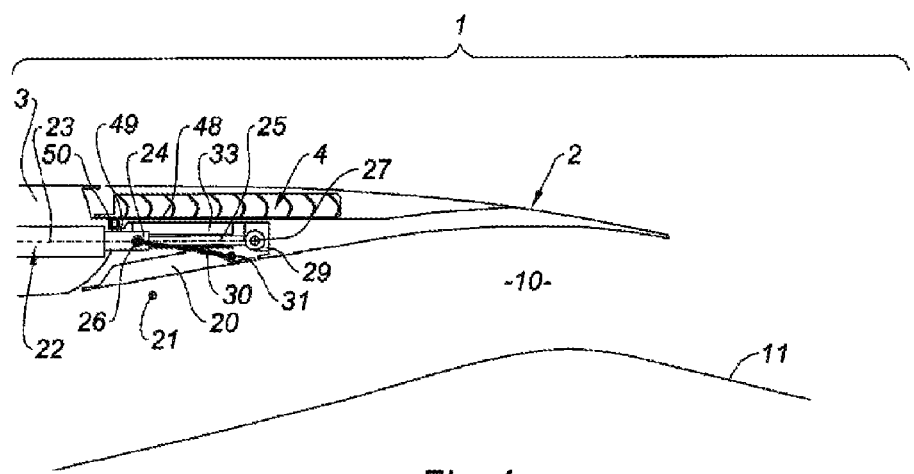
FIG. 1 is a partial schematic, longitudinal sectional view along a plane passing through an actuating cylinder of a cascade thrust reverser according to one embodiment of the invention, the thrust reverser being in closed position.

The thrust reverser 1 in FIGS. 1 to 12 is associated with a turbofan jet engine (not illustrated) and comprises an outer nacelle which, with an inner concentric structure 11, defines an annular bypass duct 10 allowing the passing of the cold air stream.

A cowl 2 sliding longitudinally is formed of two semi-cylindrical parts mounted on the nacelle so that they can slide along slide-rails (not illustrated).

An opening provided with fixed diverting means, in particular in the form of diverting vanes 4, is arranged in the outer nacelle of the thrust reverser 1. This opening, under conditions of direct thrust of the gases, is closed by a sliding cowl 2 and it is uncovered under thrust reversing conditions via a movement in longitudinal translation in downstream direction (with reference to the direction of flow of the gases) of the sliding cowl 2 along the main longitudinal centreline of the nacelle.

A plurality of blocker doors 20 distributed over the circumference of the cowl 2, are each pivot mounted at an upstream end around a hinge pin 21 on the sliding cowl 2, between a stowed position and a deployed position in which, in thrust reversing situation, they block the bypass duct 10 in order to divert a stream of cold air towards the cascade opening 4. A sealing gasket (not illustrated) can be provided on the surround of each blocker door 20 in order to isolate the flow circulating in the bypass duct 10 from the flow outside the nacelle.

During the operation of the turbojet engine under direct thrust (see FIG. 1), the sliding cowl 2 forms all or part of a downstream part of the nacelle, the blocker doors 20 being stowed inside the sliding cowl 2 which closes the cascade opening 4.

Figure 2:
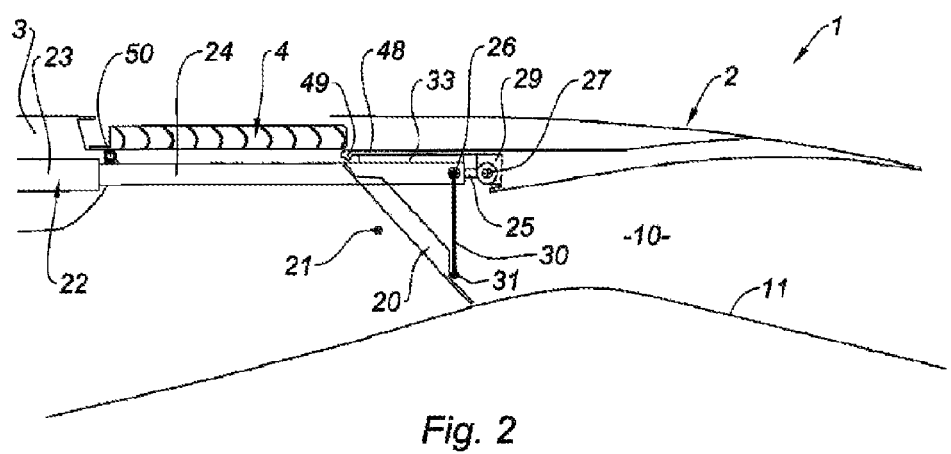
FIG. 2 is a similar view to FIG. 1 during a deployment phase of the blocker door, to block the annular bypass duct.

To reverse the thrust of the turbojet engine, the sliding cowl 2 is moved to downstream position and the blocker doors 20 pivot to blocking position so as to divert the secondary air stream towards the cascade vanes 4 and to form a reverse flow guided by the vanes 4 (see FIG. 2).

Figure 3:
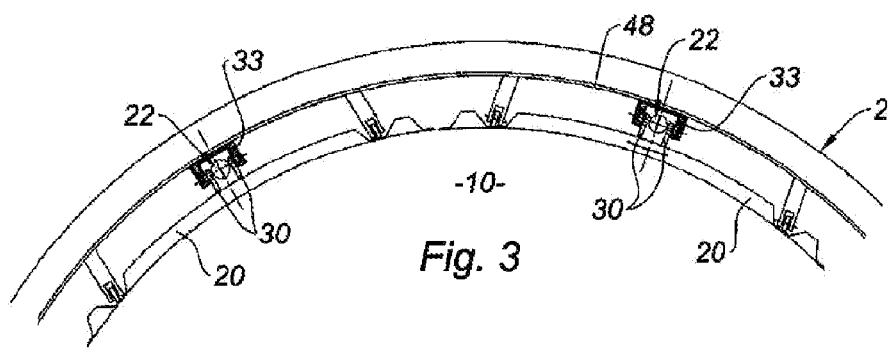
FIG. 3 is a partial schematic, cross-sectional view of a cascade thrust reverser according to one embodiment of the invention.

As illustrated in FIGS. 1 to 3, the blocker door(s) 20 are pivot mounted at an upstream end on the sliding cowl 2 via a driving link 30. It is also possible for the blocker door(s) 20 to be pivot mounted at a downstream end on the sliding cowl 2 via the driving link 30.

The sliding cowl 2 and the blocker door(s) 20 may be mobile via separate actuating cylinders, of which at least one is connected to the sliding cowl 2 and another to the blocker door(s) 20. This allows an opening to be obtained during the thrust reversing phase which may be deferred even controlled. In this case, the said actuating cylinders comprise a rod connected either to the sliding cowl 2 or to the blocker door(s), the rod sliding in a substantially fixed slider.

According to one variant illustrated in FIGS. 1 to 3, the sliding cowl 2 is mobile via at least one actuating cylinder 22 comprising a driving slider 24 surrounding a terminal rod 25 connected to the sliding cowl 2. The driving link 30 is fixed onto the said slider 24 so that a movement in translation of the actuating cylinder 22 in one direction is accompanied by a movement in translation of the sliding cowl 2 in the same direction and by a pivoting movement of the driving link 30 and blocker door 20. This enables the said sliding cowl 2 to change over alternately from a closed position in which the blocker door 20 is in stowed position and the sliding cowl 2 ensures the aerodynamic continuity of the nacelle by covering the diverting means 4, and an open position in which the sliding cowl 2 opens a passageway in the nacelle by uncovering the diverting means 4 and the blocker door 20 is in pivoted position blocking part of the bypass duct of the nacelle.

More precisely, the driving slider 24 driving a blocker door (or two blocker doors 20 positioned either side of the slider 24) is mounted mobile in one or two lateral slide-rails 33 for guiding in translation arranged in a structure of the sliding cowl 2.

The driving slider 24 is connected to a downstream end of the blocker door 20 via the driving link 30 hinged on the blocker door 20 around a pin 31 and on the driving slider 24 around a transverse pin 26, so that a differential movement in translation causing the tip 26 of the driving slider 24 in its guiding slide-rail(s) 33 to draw close to the driving point 27 of the sliding cowl, is accompanied by pivoting of the link 30 and hence of the blocker door 20. According to the variant in which the blocker door(s) 20 are pivot mounted at a downstream end on the sliding cowl 2, the driving slider 24 is connected to an upstream end of the blocker door 20 via the driving link 30 so that a differential movement in translation, causing the tip 26 of the driving slider 24 in its guiding slide-rails(s) 33 to draw away from the driving tip 27 of the sliding cowl is accompanied by pivoting of the link 30 and hence of the blocker door 20.

It is possible for two and even more links 30 to be positioned on each side of the driving slider 24.

The lateral guiding slide-rails 33 ensure transmission of forces therefore avoiding the risk of buckling of the actuating cylinder 22 due to aerodynamic pressure on the blocker doors 20.

The guiding slide-rails 33 (see FIGS. 5 and 6) are arranged either side of the driving slider 24, each receiving one end— provided with a shoe or roller 32—of the transverse hinge pin 26 of the driving link(s) 30 on an end of the driving slider 24.

Here, the driving slider 24 forms an intermediate mobile section 24 of a <<telescopic>> actuating cylinder 22 arranged along a longitudinal axis of the reverser.

This actuating cylinder 22, pneumatic, electric or hydraulic, comprises a tubular base 23 connected, either fixed or jointed, to the outer nacelle upstream (at 3) of the reverser 1. The base 23 houses the driving slider 24 and the terminal rod 25, both mounted independently of each other and sliding axially in the base 23 of the actuating cylinder 22.

A downstream end of the terminal rod 25 is connected to the sliding cowl 2 via a transverse driving pin 27 housed in a cavity of oblong shape perpendicular to the direction of movement of the cowl 2, and provided in a bracket 29 of the sliding cowl 2. This cavity allows the avoiding of any alignment of hyperstatic points between the base 23 of the actuating cylinder 22, the pivot pin 26 at the end of the mobile section 24, and the driving pin 27 at the end of the terminal rod 25.

The actuating cylinder 22 is controlled so as to drive the driving slider 24 in translation within its guiding slide-rails 33 advantageously throughout the entire travel in translation towards downstream.

The rate of opening of the blocker doors 20, at the start of the opening phase of the sliding cowls 2, is faster than the opening of the said cowl 2. As a result, at the start of the opening phase of the sliding cowls 2, the section of the passageway through the nacelle is narrower than the section of the bypass duct 10 blocked by the blocker doors. This gives rise to increased pressure in the engine which implies difficult management of the turbojet engine speed during this transitory phase.

The actuation of the sliding cowl 2 and the pivoting of the blocker doors 20 must therefore take place simultaneously but at different speeds.

Figure 4:
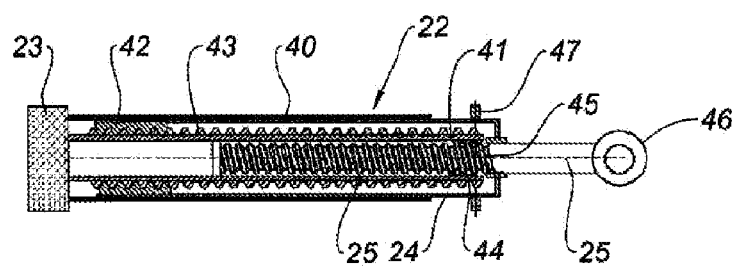
FIG. 4 and FIG. 5 are partial, schematic, longitudinal section views of one embodiment of an actuating cylinder used in the invention, in closed position and in deployed position.
Figure 5:
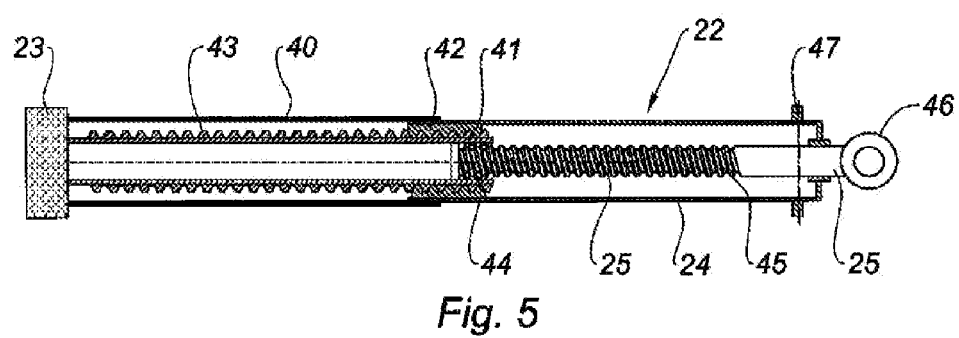

To do so, the actuating cylinder 22 is configured so that the driving slider 24 and the terminal rod 25 are able to be set in movement in substantially synchronized manner at different speeds, as is proposed in patent application FR 2 917 788. Therefore, as illustrated in FIGS. 4 and 5, the actuating cylinder 22 of the invention comprises a cylindrical sleeve 40 inside which three concentric rod-forming bodies are housed, namely the driving slider 24 and the terminal rod 25, and an intermediate body 41 positioned between the driving slider 24 and the terminal rod 25.

Each of the three bodies 41, 24, 25 is mechanically engaged with the adjacent body via a screw thread.

More precisely, the intermediate body 41 has an inner thread 42 engaged with a corresponding outer thread 43 carried by the driving slider 24, the latter also having an inner thread 44 engaged with a corresponding outer thread 45 carried by the terminal rod 25.

Also, the intermediate body 41 is locked in translation and mounted in rotation on driving means (not illustrated) housed in the base 23 of the actuating cylinder.

The driving slider 24 and the terminal rod 25 are locked in rotation and left mobile in translation. The locking in rotation may be obtained by the simple fixing of the intermediate body 41 and driving slider 24 onto the mobile parts which they are respectively intended to drive, namely the sliding cowl 2 and the blocker door 20. For this purpose, the terminal rod 25 ends in a mounting eyelet 46 whilst the driving slider 24 has lateral driving pins 47 on which the driving links 30 are attached.

The functioning of said cylinder is as follows. When the actuation means drive the intermediate body 41 in rotation, they transmit this movement to the driving slider 24 and to the terminal rod 25 via the respective threads 42 to 45. Since the driving slider 24 and the terminal rod 25 are locked in rotation, the driving movement of the intermediate body 41 is converted to a translational movement. The driving slider 24 and the terminal rod 25 therefore undergo a movement in translation whose direction depends on the direction of rotation of the driving means and on the orientation of the threads 42 to 45. In addition, the linear translation speed of the driving slider 24 and of the terminal rod 25 is a function of the pitch of each thread 42 to 45 whilst the speed of rotation is identical.

Starting from the single driving in rotation of the intermediate body 41, the driving in translation is therefore obtained of each of the bodies 24, 25 connected to a corresponding mobile part, this driving taking place synchronously at relative speeds that can easily be adapted via the pitch of the threads 42 to 45.

The pitch of the outer threads 42, 43 may be smaller than the pitch of the inner threads 44, 45. This means that the driving slider 24 will move in translation at slower speed than the terminal rod 25.

Conversely, the pitch of the outer threads 42, 43 may be larger than the pitch of the inner threads 44, 45. This means that the driving slider 24 will move in translation at a faster speed than the terminal rod 25.

The direction of the driving link 30 during the thrust reversing phase may be substantially normal to the axis of the driving slider 24. Therefore, it is possible to best adapt the relative play between the inner structure of the turbojet engine and the downstream profiling of the blocker doors 20. The management of the blocking of the bypass duct 10 during the reversing phase is thereby facilitated.

The actuating cylinder 22 is arranged substantially in a plane allowing the attachment of the driving pivot of the sliding cowl 2 in a manner substantially aligned with the axis of the actuating cylinder 22.

The driving pivot of the sliding cowl 2 may be positioned downstream of the blocker door 20.

For example it is advantageously possible, during the thrust reversing phase, to position the driving tip of the end of the link 26 as close as possible to the driving tip 27 of the sliding cowl 2. Also, this arrangement allows the force generated by the stream of cold air to be placed on the blocker door 20 along the axis of the link 30. Typically, this door is arranged substantially normal to the guiding slide-rail 33.

The diverting means 4 and the actuating cylinder(s) 22 are arranged in two substantially parallel planes, one over the other in a radial direction of the nacelle.

The sliding cowl 2 may further comprise a diaphragm 48 configured to ensure sealing of the nacelle in closed position. The diaphragm 48 may be integrated in or added onto the structure of the sliding cowl 2. As illustrated here, the diaphragm 48 is positioned between the plane of the diverting means 4 and the plane of the actuating cylinders when the sliding cowl 2 is in closed position.

Therefore, in direct thrust phase the diaphragm 48 substantially covers the diverting means 4, blocking any leakage of cold air towards the diverting means. In thrust reversing phase, the diaphragm 48 is driven downstream with the remainder of the sliding cowl 2 so as to uncover an opening through which the cold air stream of the bypass duct 10 can reach the diverting means 4.

The diaphragm 48 can be positioned as close as possible to the inner surface of the thrust reversing means 4 in order to reduce leaks of cold air during reverse flow operation to a tolerable minimum, without having recourse to any additional sealing system The guiding slide-rail(s) 33 are carried by the diaphragm 48. According to one embodiment, at least one of these guiding slide-rails 33 is reinforced so as to guide the driving slider 24 and to prevent bending of the driving slider 24 of the actuating cylinder 22.

As illustrated in FIGS. 1 to 3, the diaphragm 48 comprises an excrescence 49 at the upstream end capable of being compressed against a sealing gasket 50 mounted on the fixed upstream structure 3, in closed position of the sliding cowl 2. The sealing gasket 50 is thereby protected against any outside attack, in particular against the presence of erosive elements during flow reversing. The sealing gasket can be placed in an upstream cavity in the upstream structure 3.

During the downstream movement of the driving slider 24 and the concomitant pivoting of the blocker door 20, the door may abut against the said slider 24 risking damage thereto and limiting the deployment of the blocker door 20. To solve this problem, it is possible for the blocker door(s) 20 to have an upstream cut-out configured to allow the passing of at least part of the driving slider 24.

According to another embodiment, it is possible to offset the pivot pin 21 of the blocker door towards upstream so that the blocker door 20 no longer interferes with the driving slider 24 at the end of rotation.

According to a further embodiment, the diaphragm 48 comprises a notched upstream end to allow the passing of at least part of the driving slider 24. On this account, complete smoothing during the direct thrust phase is ensured.

Figure 6:
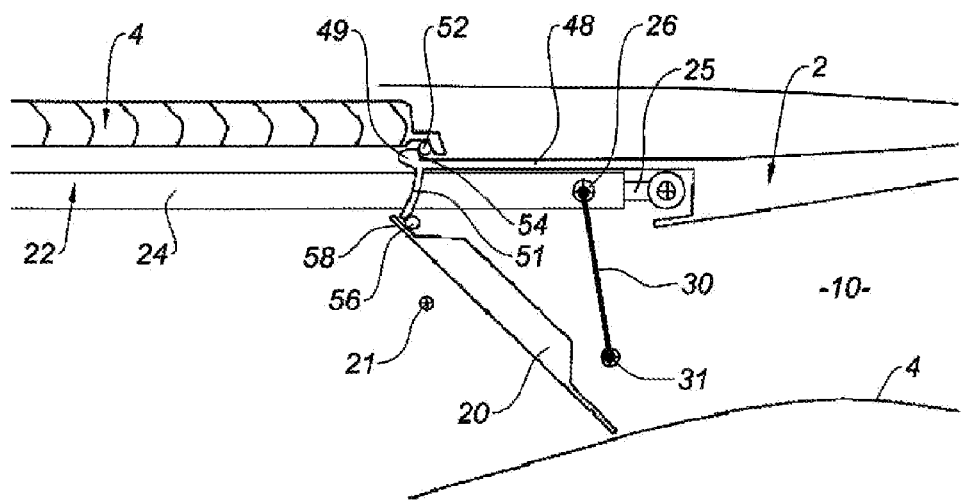
FIG. 6 is a partial schematic, longitudinal section view along a plane passing through an actuating cylinder of a reverser of the invention according to another embodiment.

The diaphragm 48 may also comprise an upstream apron 51 with a cut-out to allow the passing of the driving slider 24 (see FIG. 6). The apron 51 is sized so that it adapts to the shape of the opposite-facing part of the upstream structure 3. In particular, the apron 51 can be sized such that it can lie the closest possible to the inner surface of the blocker door 20, in particular it may be flush therewith. A said characteristic firstly allows adjustment of the angle of the blocker door 20 during the thrust reversing phase, and secondly it allows a reduction in the size of the said blocker door 20 and a reduction of aerodynamic forces on the latter.

According to one advantageous embodiment, the apron 51 is scalloped, namely the surface of the platform has a multitude of scallops to offset the curve of the blocker door(s) 20 in deployed position. This characteristic also allows the performance of thrust reversing to be increased by blocking potential surfaces of cold air leakage in the bypass duct 10.

As illustrated in FIG. 6, first sealing means 52 are arranged between the upstream end 42 of the diaphragm and the downstream end 54 of the diverting means, and second sealing means 56 are arranged between the apron 51 of the diaphragm and the upstream end 58 of the blocker door(s). Therefore the reversing performance levels of the cold air stream are further improved by the reverser 1 of the invention, by reducing any leak of air in the bypass duct 10 and in the inner structure of the sliding cowl 2.

Figure 7:
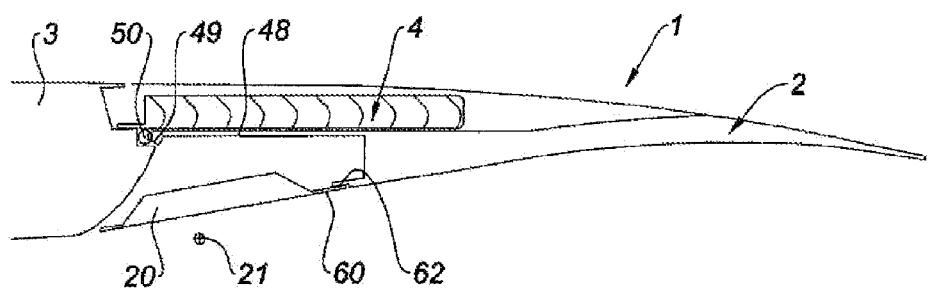
FIG. 7 is a partial schematic, longitudinal section view of a thrust reverser according to another embodiment.

As shown in FIG. 7, the downstream end 60 of a blocker door may substantially cover an upstream extension 62 of the sliding cowl 24, which allows the ensured continuity of aerodynamic lines and provides retaining of the blocker door 20 flat against the surface of the mobile cowl, by associating an elastic system with the mechanical driving system of the blocker door 20. A spring system fixed onto one of the pins of the driving link 30 may fulfil this function.

To simplify the management of the reliability of the reverser 1 according to the invention, and the synchronization of the actuating cylinders 22, it may be advantageous to have a different number of actuating cylinders 22 and blocker doors 20 which also reduces the weight of the reverser 1 of the invention.

Figure 8:
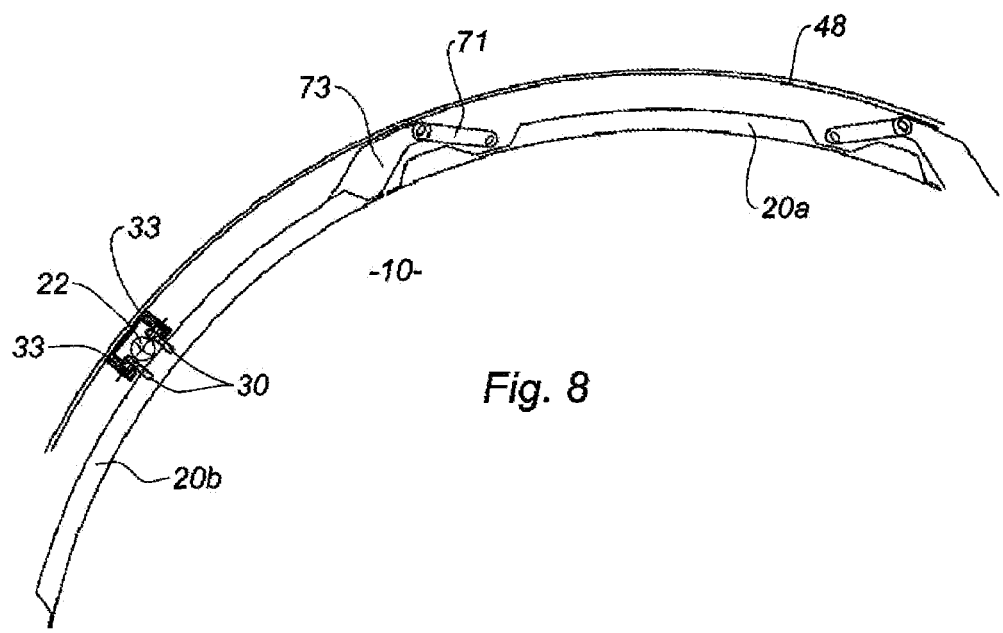
FIG. 8 is a partial, cross-sectional view of a cascade thrust reverser according to one embodiment of the invention.
Figure 9:
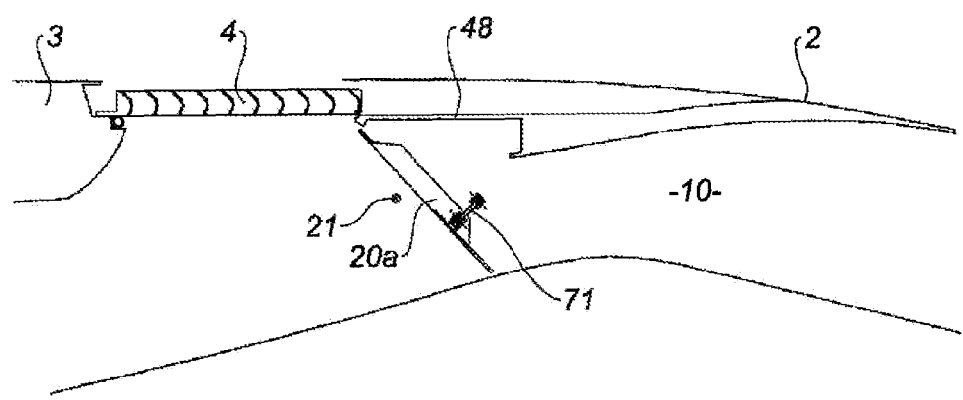
FIG. 9 is a partial schematic, longitudinal section view of a reverser of the invention according to one variant.

According to one advantageous embodiment, illustrated in FIGS. 8 and 9, at least one of the driven blocker doors 20a is driven by one or both adjacent blocker doors 20b, each controlled by an actuating cylinder 22. To achieve this, the driving is carried out using an adapted mechanical system.

The number of blocker doors may be between three and five, even more, associated with two actuating cylinders 22 on each side of the nacelle.

It is also possible to design a single actuating cylinder 22 driving three blocker doors 20 via a servo system. A said configuration allows simplification of the driving assembly. For this purpose, the driving blocker doors 20b are positioned ahead of the driven blocker door 20b during the thrust reversing phase.

The general configuration of the driven blocker door 20a may be substantially similar to that of the driving blocker door 20a, even substantially identical in terms of size, profiling and positioning of the axis of rotation.

According to one preferred embodiment, the driving of the driven blocker door 20a is obtained by a transmission link 71 mounted at one end of the driven blocker door 20a and cooperating with an arm 73 fixed onto the driving blocker door(s) 20b.

The arrangement of the driving assembly for the driven blocker door 20a allows distancing of the overlapping part of the blocker doors 20a and 20b during the manoeuvring phase thereof.

Figure 10:
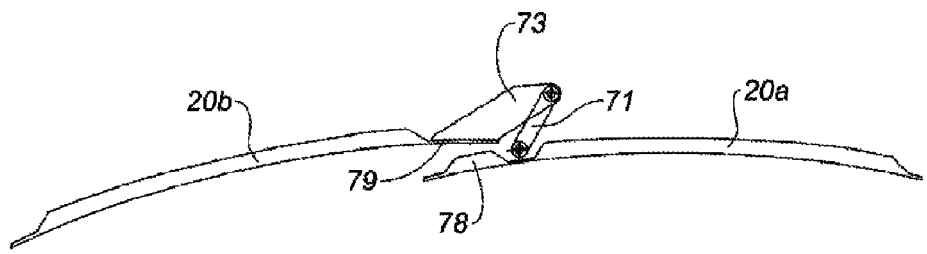
FIG. 10 is a partial schematic, cross-sectional view of a cascade thrust reverser according to one embodiment of the invention.

The mechanical driving assembly formed by the arm 73 and the transmission link 71 can be positioned so that it allows the overlapping of the lower ends 78 and 79 of the blocker doors 20a and 20b (see FIG. 10).

With said arrangement it is possible to obtain a longer length of transmission link 71 and greater leverage.

The actuating cylinder 22 can be off-centred relative to the driving blocker door 20b and offset towards the driven blocker door 20a in order to balance forces on the blocker doors 20a and 20b and on the driving assembly.

The linkage of the driving assembly of the driven blocker door 20a may substantially exceed the lateral part of a driving blocker door 20b.

An anti-buffeting system can be associated with the blocker doors 20a and 20b; the said system can be active in reverse mode. It is also possible to provide for an anti-lateral torsional buckling system for the driven blocker door 20a which, in the event of failure, is associated with the driving assembly during the direct thrust phase.

Also, it is possible to position an arm 73 laterally on the inner structure of the driving blocker door 20b on the side adjoining the driven side 20a (see FIG. 8). Therefore the connecting point of the arm 73 with the transmission link 71 can be cantilevered relative the structure of the driven blocker door 20a thereby improving driving kinematics. The angle formed by the transmission link 71 with the driven blocker door 20a depends upon the available space for housing the driving assembly during the direct thrust phase.

In this configuration, there may be problems relating to manufacturing tolerance, play and positioning, leading to an unstable position of the driven blocker door 20a. To solve this problem, it is possible to provide a fixed bearing point, for example downstream of the driven blocker door 20a on the mobile structure 2, allowing the ensured continuity of aerodynamic lines and providing the flat retaining of the driven blocker door 20a by associating an elastic system with the mechanical driving assembly. For this purpose, it is possible for one of the pins of the transmission link to comprise a spring system as set forth above.

Figure 11:
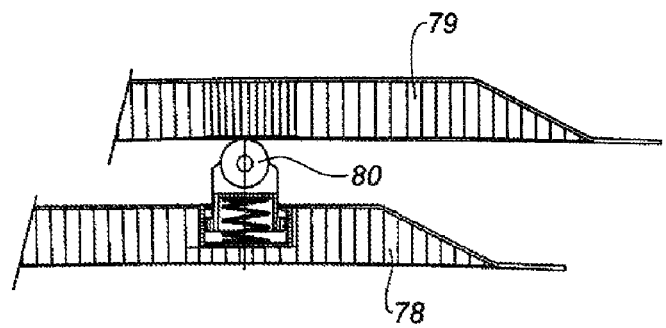
FIG. 11 is a partial schematic, cross-sectional view of a cascade thrust reverser according to one embodiment of the invention.

The driving 20b and driven 20a blocker doors may be capable substantially of overlapping one another at one of their ends 79 and 78, at least one end being equipped with elastic or tensioning means 80 (see FIG. 11).

The overlap area during reversing of the cold air stream may undergo perturbing aerodynamic effects and undergo deformation stresses under vibration, which are avoided with a said configuration.

To further limit these effects, the carrier structure of the contact element can be placed on or in the rear part of the blocker door lying in front of the second.

The part 79 of the blocker door coming into contact with the elastic or tensioning means 80 may comprise a surface reinforcement in particular in the form of a panel enclosing a unit with honeycomb core (see FIG. 11) to transmit the forces due to the contact.

The contact between the elastic or tensioning means 80 and the part 79 of the blocker door can be obtained by friction or bearing. The said elastic or tensioning means 80 can be added on as shown in FIG. 11 or integrated in the structure of the blocker door.

For overlapping in thrust reversing mode, it is not necessary to provide for lateral cut-outs or for a fixed structure matching the cut-outs of the blocker doors, thereby reducing costs and increasing the acoustic surface.

To ensure failsafe positioning of the driven blocker door 20a during the direct thrust phase even in the event of loss of one of the transmission links 71, the driven blocker door 20a may comprise upstream abutment means capable of abutting an element of mating shape in the fixed structure when the said blocker door is in stowed position.

Figure 12:
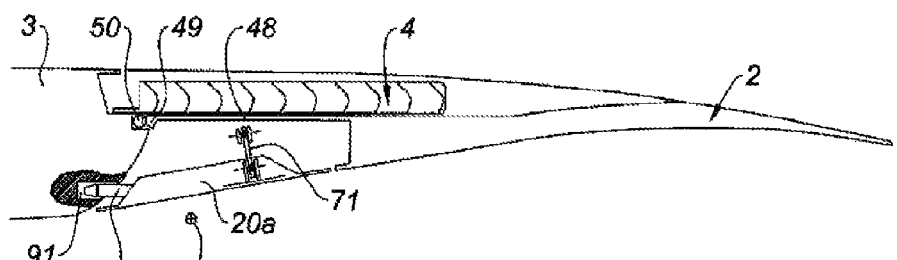
FIG. 12 is a partial schematic, longitudinal section view of a reverser of the invention according to another embodiment of the invention.

The abutment means are a stop pin 90 able to fit into a housing 91 provided in the fixed structure 3 (see FIG. 12).

This abutment function can also be obtained by a locking system independent of the fixed structure 3 and of the driven blocker door 20a, forming part of the control logics of the reverser.

The driven blocker door 20b may also comprise an upstream abutment during direct thrust phase associated with an elastic system mounted in particular on the driving assembly.

The invention claimed is:

1. A thrust reverser for a nacelle of a turbofan jet engine comprising:
    an upstream structure,
    fixed diverting means attached to the fixed upstream structure, the diverting means being capable of diverting at least part of a cold air stream of a turbojet engine outside the nacelle,
    a sliding cowl sliding in translation in a direction substantially parallel to a longitudinal axis of the nacelle,
    a plurality of blocker doors including at least one driven blocker door and at least one driving blocker door pivot mounted at an upstream end on the sliding cowl, and the at least one driving blocker door being driven via at least one driving link,
    the sliding cowl being mobile via at least one actuating cylinder, and the at least one driving blocker door also being connected to the at least one actuating cylinder via the at least one driving link so that a movement in translation of the at least one actuating cylinder of the sliding cowl and of the at least one actuating cylinder of the at least one driving blocker door enable the sliding cowl to move alternatively from a closed position, in which the at least one driving blocker door is in stowed position and the sliding cowl ensures aerodynamic continuity of the nacelle by covering the diverting means, to an open position in which the sliding cowl opens a passageway in the nacelle by uncovering the diverting means and the at least one driving blocker door is in pivoted position blocking part of an annular bypass duct of the nacelle,
    wherein the diverting means and the at least one actuating cylinder are arranged in two substantially parallel planes one above the other in a radial direction of the nacelle, and the at least one driven blocker door is driven by one or both adjacent the at least one driving blocker door controlled by the at least one actuating cylinder; and
    wherein the driving of the at least one driven blocker door is obtained via a transmission link mounted on a side of the at least one driven blocker door and cooperating with an arm fixed onto the at least one driving blocking door.

2. The reverser according to claim 1, wherein the arm and the transmission link are positioned so that they allow the overlapping of the lower ends of the plurality of blocker doors.

3. The reverser according to claim 1, wherein the arm is positioned laterally on an inner structure of the at least one driving blocker doors on a side adjoining the side of the at least one driven blocker door so that a connecting point of the arm with the transmission link is cantilevered relative to the structure of the at least one driven blocker door.

4. The reverser according to claim 1, wherein a pin of the transmission link comprises a spring system.

5. The reverser according to claim 1, wherein the at least one driven blocker door comprises upstream abutment means capable of abutting an element of mating shape in the fixed upstream structure when the at least one driven blocker door is in stowed position.

6. The reverser according to claim 5, wherein the abutment means are a stop pin able to fit into a housing provided in the fixed upstream structure.

7. The reverser according to claim 1, wherein the plurality of blocker doors are capable substantially of overlapping at one of their ends, at least one end being equipped with elastic or tensioning means.

8. The reverser according to claim 7, wherein a part of the plurality of blocker doors coming into contact with the elastic or tensioning means comprises a surface reinforcement in the form of a panel enclosing a unit with honeycomb core.

9. The reverser according to claim 1, wherein a single actuating cylinder drives three blocker doors via a servo system.

10. The reverser according to claim 1, wherein the sliding cowl further comprises a diaphragm configured to ensure sealing of the nacelle in closed position, the diaphragm being positioned between a plane of the diverting means and a plane of the at least one actuating cylinder when the sliding cowl is in closed position.

11. The reverser according to claim 10, wherein the diaphragm comprises an upstream apron.

12. The reverser according to claim 11, wherein the apron is scalloped.

13. The reverser according to claim 10, wherein first sealing means are arranged between an upstream end of the diaphragm and a downstream end of the diverting means.

14. The reverser according to claims 11, wherein second sealing means are arranged between the apron of the diaphragm and the upstream end of the plurality of blocker doors.

15. A nacelle for turbofan jet engine, comprising a thrust reverser according to claim 1.